United States Patent [19]
Dowd

[11] Patent Number: 6,102,280
[45] Date of Patent: Aug. 15, 2000

[54] COLLAPSIBLE CORRUGATED PLASTIC BOX HAVING IMPROVED TEAR RESISTANCE

[75] Inventor: Fred Dowd, Princeton, Mass.

[73] Assignee: Technology Container Corporation, Shrewsbury, Mass.

[21] Appl. No.: 09/270,873

[22] Filed: Mar. 17, 1999

Related U.S. Application Data

[63] Continuation-in-part of application No. 09/211,571, Dec. 15, 1998.

[51] Int. Cl.[7] ....................................................... B65D 5/10
[52] U.S. Cl. ......................... 229/155; 229/939; 229/931; 229/940; 229/117; 229/117.16; 493/89; 493/160; 493/59; 53/139.7
[58] Field of Search .................................... 229/155, 939, 229/940, 114, 117, 117.16; 493/89, 160, 59, 60, 61, 355; 53/139.7

[56] References Cited

U.S. PATENT DOCUMENTS

| | | |
|---|---|---|
| 1,620,174 | 3/1927 | Wagner ................................ 229/939 X |
| 1,845,891 | 2/1932 | Schroeder ............................ 229/939 X |
| 1,974,061 | 9/1934 | Densen ................................. 229/939 X |
| 2,327,709 | 8/1943 | Himes . |
| 3,727,826 | 4/1973 | Shepherd ............................. 229/939 X |
| 4,289,268 | 9/1981 | Paige . |
| 4,682,727 | 7/1987 | Stoll ......................................... 229/114 |
| 4,763,833 | 8/1988 | Stoll ......................................... 229/117 |
| 4,834,255 | 5/1989 | Boots ....................................... 229/199 |
| 4,948,039 | 8/1990 | Amatangelo . |
| 5,114,034 | 5/1992 | Miller et al. ......................... 229/114 X |
| 5,232,149 | 8/1993 | Stoll ..................................... 229/114 X |
| 5,335,789 | 8/1994 | Taravella et al. .................... 229/199 X |
| 5,503,324 | 4/1996 | Bacchetti et al. .................... 229/939 X |

*Primary Examiner*—Stephen P. Garbe
*Assistant Examiner*—Tri M. Mai
*Attorney, Agent, or Firm*—David W. Brownlee; Eckert Seamans Cherin & Mellott, LLC

[57] ABSTRACT

This invention provides a collapsible box made of corrugated plastic, which has improved hinge line/score line configurations between walls and panels and improved hand holds. A plastic box of this invention preferably has an automatically lockable bottom to facilitate erection of the box, and can be easily collapsed for return shipment and reuse.

18 Claims, 7 Drawing Sheets

COLLAPSIBLE CORRUGATED PLASTIC BOX HAVING IMPROVED TEAR RESISTANCE

CROSS-REFERENCE TO RELATED APPLICATION

This is a continuation-in-part of application Ser. No. 09/211,571, filed Dec. 15, 1998, and entitled "Collapsible Corrugated Plastic Box".

BACKGROUND OF THE INVENTION

1. Field of the Invention

This invention relates to collapsible boxes and more particularly a collapsible box made of corrugated plastic.

2. Description of the Prior Art

Collapsible corrugated boxes and cartons made of paperboard are well known in the art. Such boxes and cartons typically include vertical side walls and top and bottom flaps on the side walls for forming a bottom end wall and a top closure for the box. The paperboard is crushed along lines between adjacent side walls and between the side walls and the flaps to form "score lines" or hinge lines for bending the paperboard.

It is known to provide a foldable carton having hinged together bottom panels for automatically forming the carton bottom when the carton is erected. Cartons having such automatically forming bottoms are disclosed in U.S. Pat. Nos. 2,327,709 and 4,289,268.

It is also known to provide a plastic box as is disclosed in U.S. Pat. No. 4,948,039. That patent discloses a container made out of fluted plastic having integral hinges between the walls and flaps and having Velcro® strips for fastening the walls and panels together. The hinges in the container are made by cutting one facing sheet in the fluted plastic and hinging the walls and flaps on the other (uncut) facing sheet. The container disclosed in that patent is said to be easily collapsible and reusable.

There is a need for an improved collapsible box made of corrugated plastic that is economical and suitable for high speed manufacture and erection. An improved plastic carton is needed that is more durable and resistant to tearing. A plastic box is needed that will set up better when erected and not collapse on itself. A corrugated plastic carton is needed that can be reused many times.

SUMMARY OF THE INVENTION

This invention satisfies the needs for an economical plastic box that can be manufactured using high speed equipment and which is durable and capable of being reused many times, and which has improved resistance to tearing and/or wearing of score lines between side walls of the box.

This invention also provides a blank for a collapsible box made of corrugated plastic, which has improved hinge/score line configurations between walls and panels. A plastic box of this invention preferably has an automatically lockable bottom to facilitate erection of the box, and can be easily collapsed for return shipment and reuse.

A collapsible box of this invention may have offset scoring for the bottom flaps so the box sets up better. Offset scoring produces a box with less memory when erected, so the box stays erected without collapsing on itself.

The score lines in a box of this invention preferably terminate short of slots cut between panels and flaps so the corrugated plastic will have increased resistance to tearing. The box also preferably has hand holds defined by cut lines that terminate in rounded corners, which also reduce risk of tearing the plastic.

Accordingly, an object of this invention is to provide an improved collapsible box made of corrugated plastic, an improved blank for such a box, and an improved method for making such a blank.

The above and other objects and advantages of this invention will be more fully understood and appreciated by reference to the following description and the attached drawings.

DESCRIPTION OF THE PREFERRED EMBODIMENTS

Figure 1:
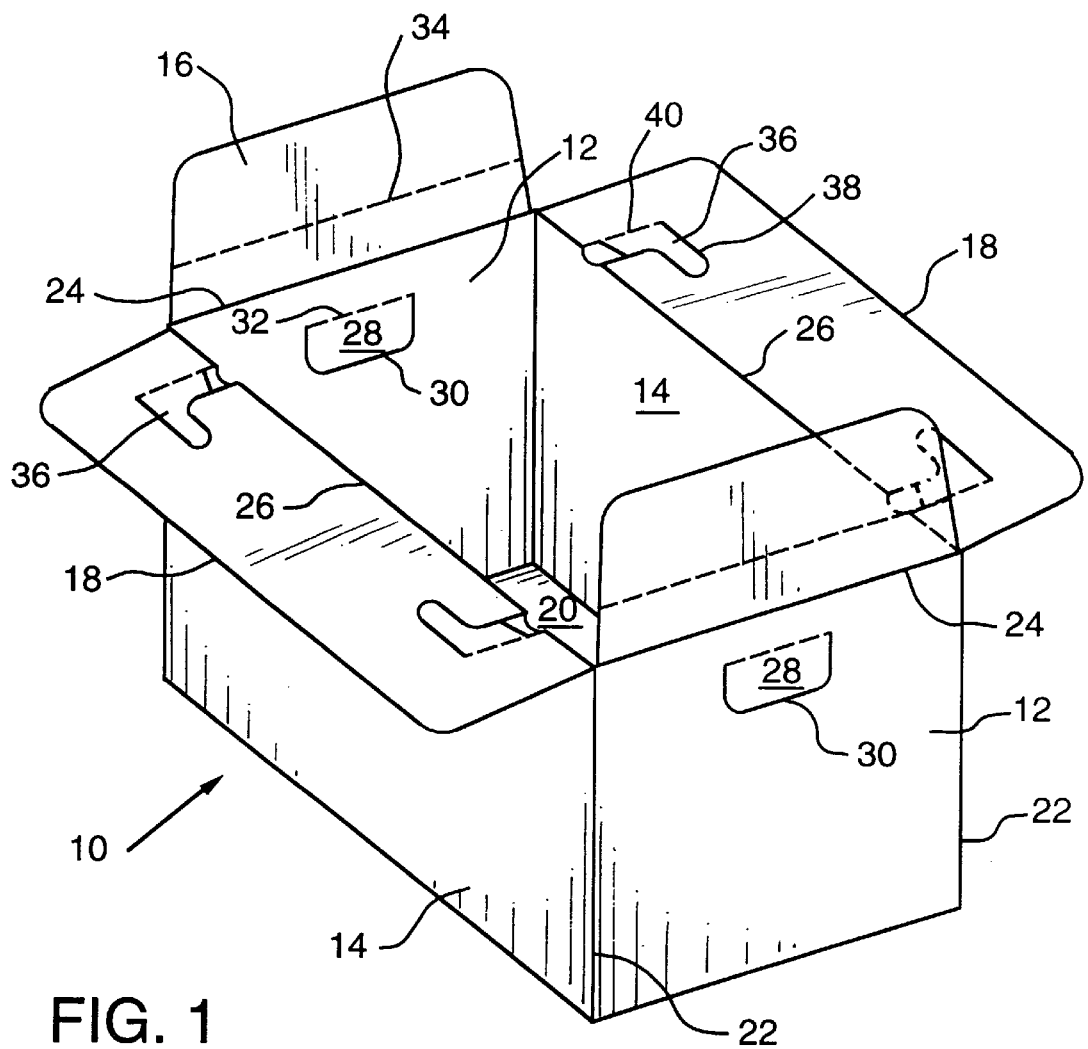
FIG. 1 is a perspective view of a collapsible box of the type suitable for use with this invention.

FIG. 1 illustrates a collapsible box 10 that is suitable for use of the present invention. The box 10 is preferably rectangular or square in footprint but may also have hexagonal or other configurations. The box has a pair of vertical width walls 12, a pair of vertical length walls 14, and a bottom closure 20 as is described below. The box optionally includes a pair of top width wall flaps 16 and a pair of top length wall flaps 18; it can also be in the form of a half slotted container, which does not include top flaps. As used herein "vertical" means perpendicular to the bottom closure 20, as shown in FIG. 1, and to the floor or other supporting surface, not shown, under the bottom closure.

The box 10 has vertical hinge lines 22 between the width walls 12 and length walls 14, hinge lines 24 between the width walls 12 and width wall flap 16, and hinge lines 26 between the length walls 14 and length wall flaps 18. The box also has hinge lines between the width walls 12, length walls 14 and bottom end wall flaps as is described below.

All score lines in the box 10 facilitate erecting and collapsing the box. In accordance with this invention, a box 10 may have unique hinge line/score line configurations which improve the performance and durability of the box.

Box 10 may also include hand holds 28 in opposite width walls 12. The hand holds 28 are defined by a cut line 30 completely through the box material and may have a hinge/score line 32 at the top of each hand hold as is described below in more detail.

The top width flaps 16 may have hinge/score lines 34 across them for forming a bend at the line, and the top length wall flaps may have L-shaped flaps 36 in them for providing slots to receive corners of the width flaps when the box 10 is closed by downward folding of the flaps 16, 18. Each L-shaped flap 36 may be defined by a cut line 38 and a hinge/score line 40 so the flap can be hinged into the box to permit insertion of the corners of flaps 16. The second flaps 36 provide a ski so the flaps can be inserted into the box without damaging the contents of the box.

Figure 2:
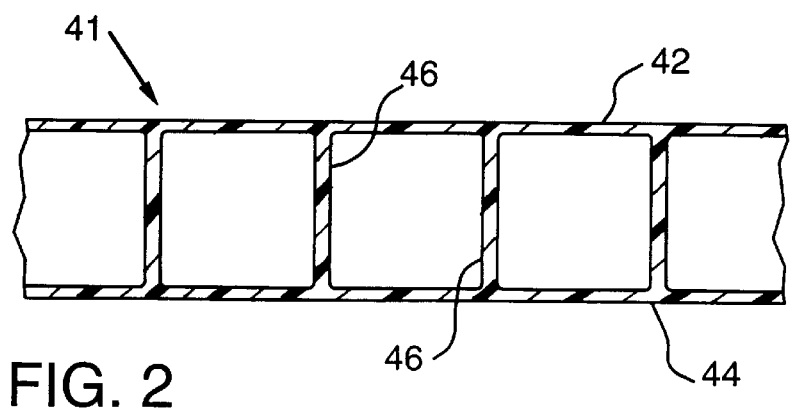
FIG. 2 is a fragmentary cross-section through corrugated plastic for use in a box of this invention.

A box 10 of this invention may be made of corrugated sheet plastic material 41 such as that shown in FIG. 2. Corrugated plastic 41 is well known material, but has received only limited application in collapsible boxes (see U.S. Pat. No. 4,948,039). Corrugated plastic 41 has parallel facing sheets 42, 44 and spaced, integral interconnecting ribs 46 between the facing sheets. The plastic sheet material 41 can be easily extruded from a variety of plastic resins such as polyethylene, polypropylene, and the like. The corrugated plastic sheet material illustrated in FIG. 2 is commonly called "profile board".

Figure 11:
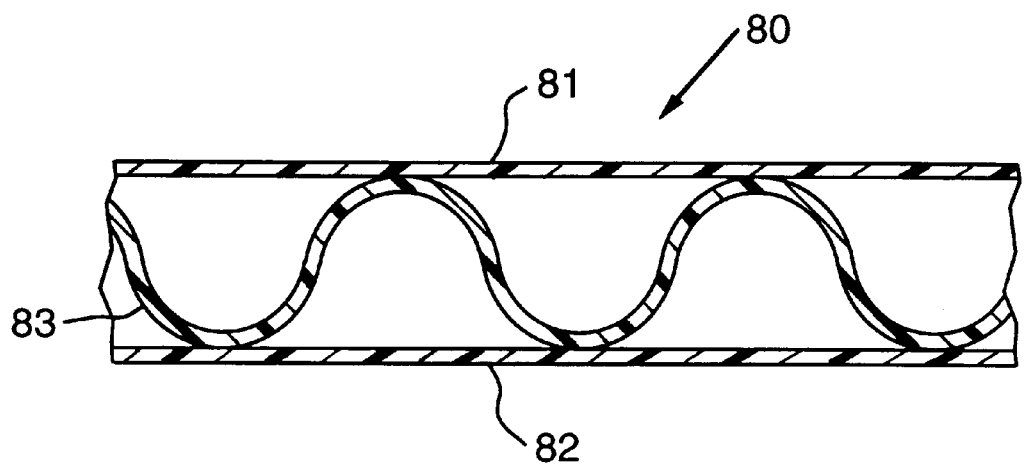
FIGS. 11 and 12 are fragmentary cross-sections through alternative corrugated plastic sheet materials that can be used in the practice of this invention.
Figure 12:
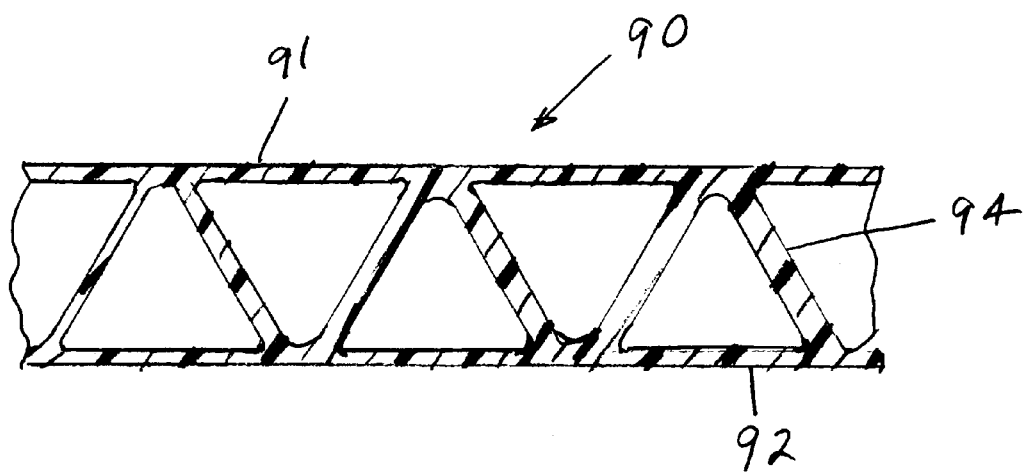

A box of this invention may also be made of other plastic sheet materials such as that shown in FIG. 11 ("corrugated board") and FIG. 12 ("conical board"). The sheet material 80 of FIG. 11 includes facing sheets 81, 82 bonded to a corrugated intermediate sheet 83 as for example by melt bonding, ultrasonic bonding or an adhesive. The conical board 90 in FIG. 12 includes facing sheets 91, 92 joined by conical ribs 94 between the facing sheets. The conical board 90 is typically manufactured by extrusion of plastic resin. Corrugated materials such as sheets 41, 80 and 90 of FIGS. 2, 11 and 12 are frequently described as fluted, with the flutes comprising the combination of the ribs or corrugations and the spaces between adjacent ribs or corrugations. As used herein, "corrugated plastic" means plastic sheet material made of parallel, spaced apart, facing sheets interconnected with ribs, corrugated intermediate sheets or the like. Corrugated plastic may be made of a variety of plastic resins such as polyethylene and polypropylene, and may be referred to as profile board, corrugated board, conical board or the like.

Figure 3:
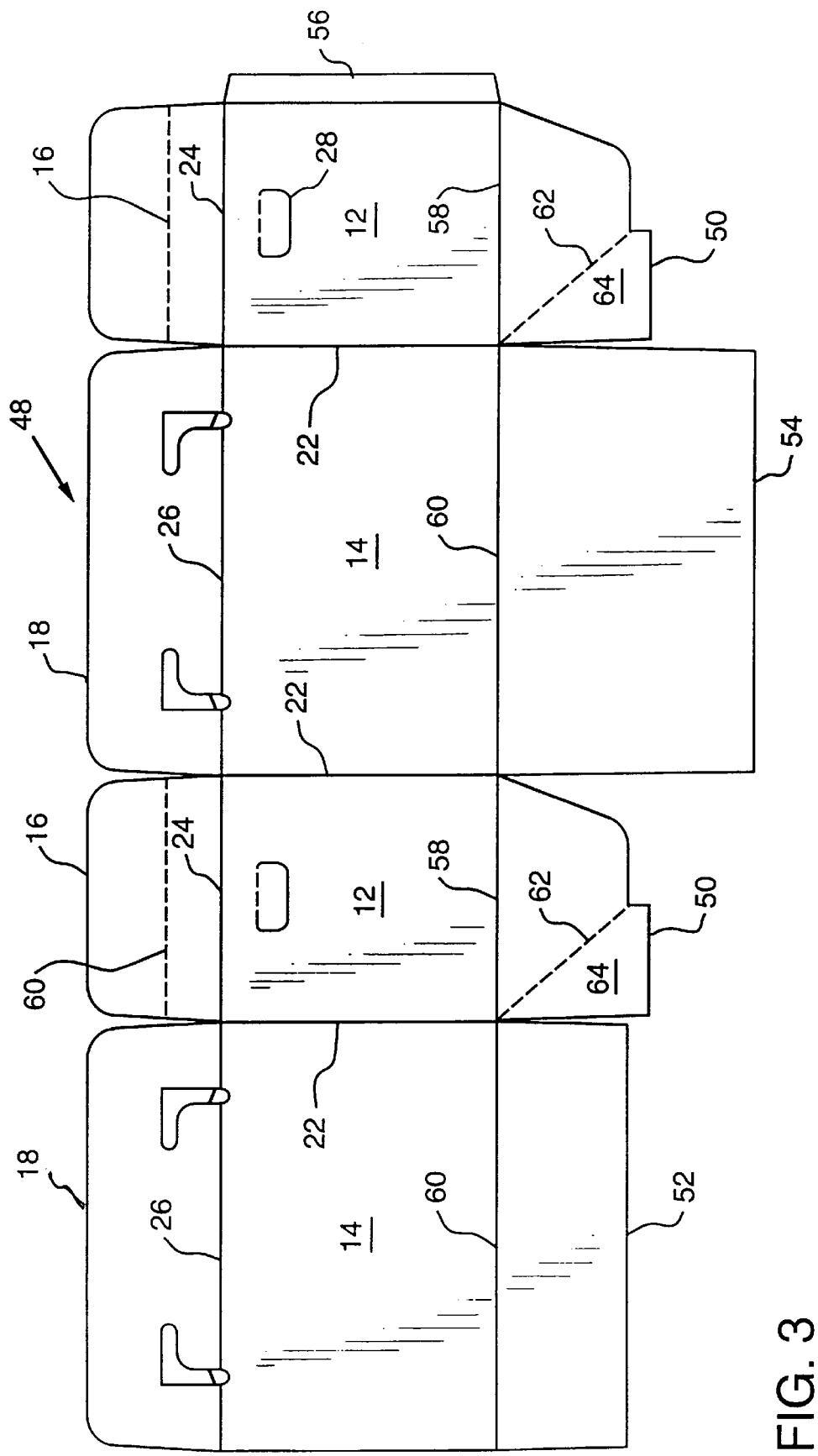
FIG. 3 is a plan view of a pattern or blank for a box having a collapsible lockable bottom suitable for use in this invention.

FIG. 3 shows a blank 48 for a preferred embodiment of a box 10 of this invention. The blank includes panels which form the width walls 12, length walls 14, top width flaps 16, top length flaps 18, bottom width flaps 50, bottom length flaps 52, 54 and glue flap 56. Score/hinge lines are also provided in the blank 48. These score lines may include score line 22 between the width walls 12 and length walls 16, score lines 24 between the width walls 12 and length wall flaps 16, score lines 26 between the length walls 14 and length wall flaps 16, scores 58 between the width walls 12 and bottom end wall flaps 50, score lines 60 between the length walls 14 and the length wall flaps 52, 54, score lines 60 in the top width wall flaps 16, and score lines 62 in the bottom end wall flaps 50. The blank 48 also preferably has hand holds 28 in the width walls 12. The score lines 62 in each of the bottom width wall flaps 50 bisect the corner where the width wall flaps meet the bottom length wall flap 52, 54, length wall 14 and width wall 12, and defines a tab portion 64, which is to be adhesively bonded to the adjacent length flap to form the automatically lockable bottom closure for a box made from the blank 48.

Figure 4:
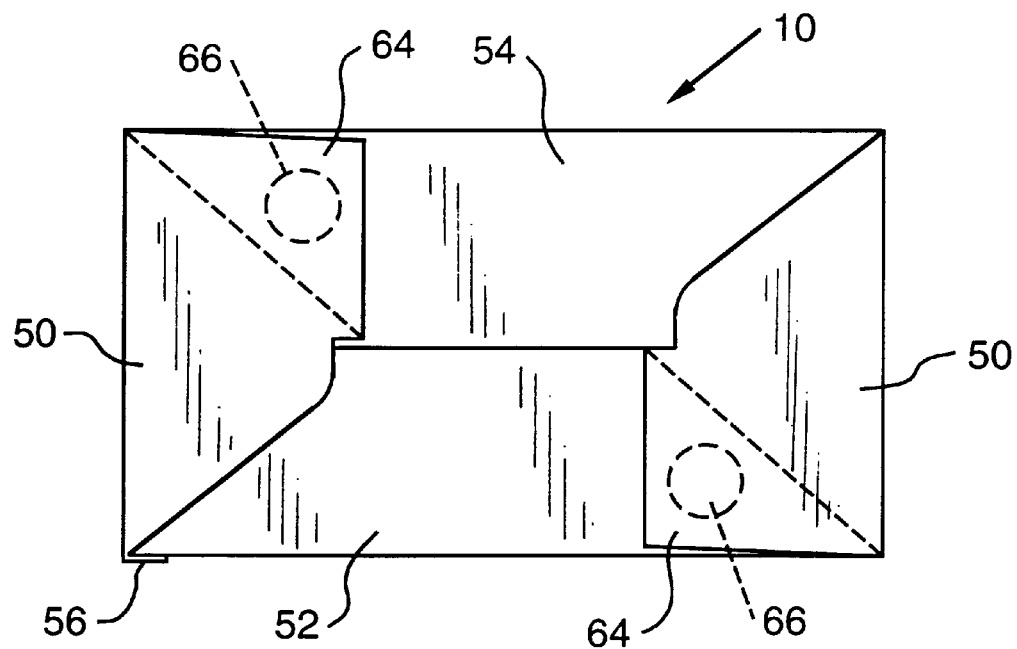
FIG. 4 is a bottom view of an erected box showing the locked bottom flaps.

Manufacture of a box 10 from the blank 48 is effected by shaping the blank into its box shape and gluing, ultrasonic welding, or otherwise connecting glue flap 56 to the exterior surface of length wall 14. The bottom flaps 50, 52, 54 are folded into a bottom closure, with flap 54 being folded first, followed by flap 52 and then flaps 50. Adhesive or glue has preferably been applied to the interface between tabs 64 and flaps 52, 54 to adhesively bond the tabs to the flaps at 66 as shown in FIG. 4. Alternatively, the tabs 64 can be joined or connected to flaps 52, 54 by ultrasonic welding or a hook and loop closure.

In accordance with this invention, the flutes formed by the ribs or corrugations and the longitudinal spaces between the ribs or corrugations (FIGS. 2, 11 and 12) are disposed at a small angle to the score lines between adjacent panels or walls in the box. Corrugated boxes made from corrugated paperboard and corrugated plastic have been heretofore formed with the flutes or corrugations aligned parallel with the score line between adjacent side and end walls so the corrugations will extend vertically in the assembled box. That alignment has been preferred because the vertically extending corrugations provide maximum stacking strength for the assembled box.

Figure 3A:
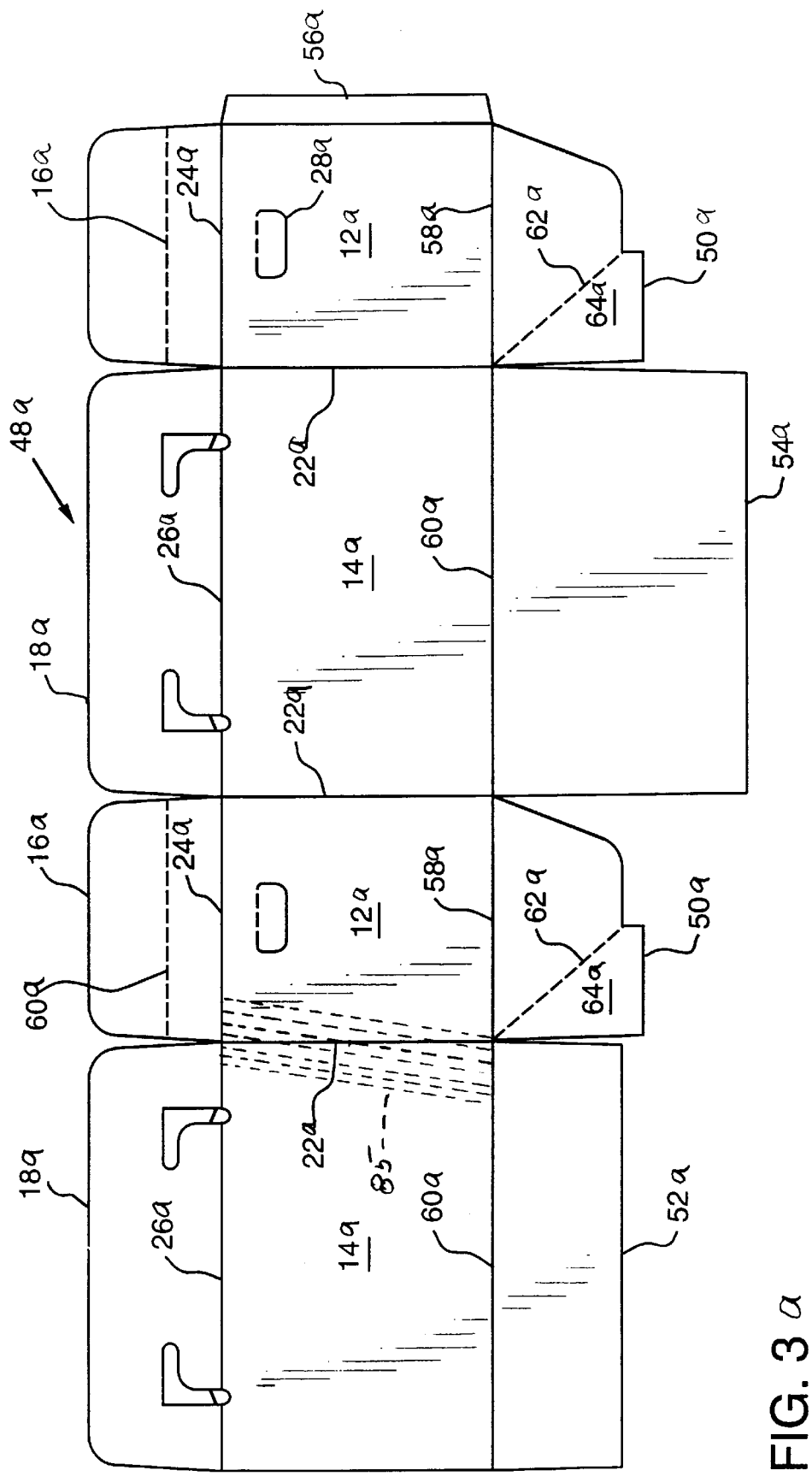
FIG. 3a is a plan view similar to FIG. 3, but further showing the orientation of the flutes and ribs in the corrugated plastic with respect to the score lines between the panels in the blank.

As shown in FIG. 3a, the flutes 85 in the sheet of corrugated plastic used to make a blank 48a of this invention are preferably aligned at an angle to the score lines 22a between adjacent side walls 12a, 14a in the blank. The spacing of the flutes and the angle of the flutes is exaggerated in FIG. 3a for purposes of illustration. An angle of about 0.75 to 4.0 degrees between the flutes 85 and the score lines 22a between adjacent side wall panels 12a, 14a of the blank is preferred. More preferably, the angle is about 1 to 2 degrees. This small angle of the flutes 85 to the score lines 22a means that each score line will cross 2–4 flutes, which substantially improves the tear and wear resistance of the plastic in the score lines. The ribs 46 and spaces or flutes between the ribs or corrugations in corrugated plastic (FIGS. 2, 11 and 12) used to make a box of this invention are typically spaced apart about ⅛ inch apart, so only a small angle of inclination is required to provide the preferred crossing of 2–4 flutes/corrugations in a box that is 8–36 or more inches high. There may be some reduction in the stacking strength of the assembled box as a result of the angled orientation of the flutes 85, but any such reduction is slight and does not significantly affect the performance of the box. For a typical box that may be about 8–36 inches high, an angle of about 1 to 2 degrees between the flutes 85 and the score lines 22a will result in the score line crossing approximately 2–3 flutes/corrugations, depending on the spacing of the ribs or corrugations in the corrugated plastic. The angle may vary depending on the height of the box and the spacing of the corrugations in the plastic.

Figure 5:
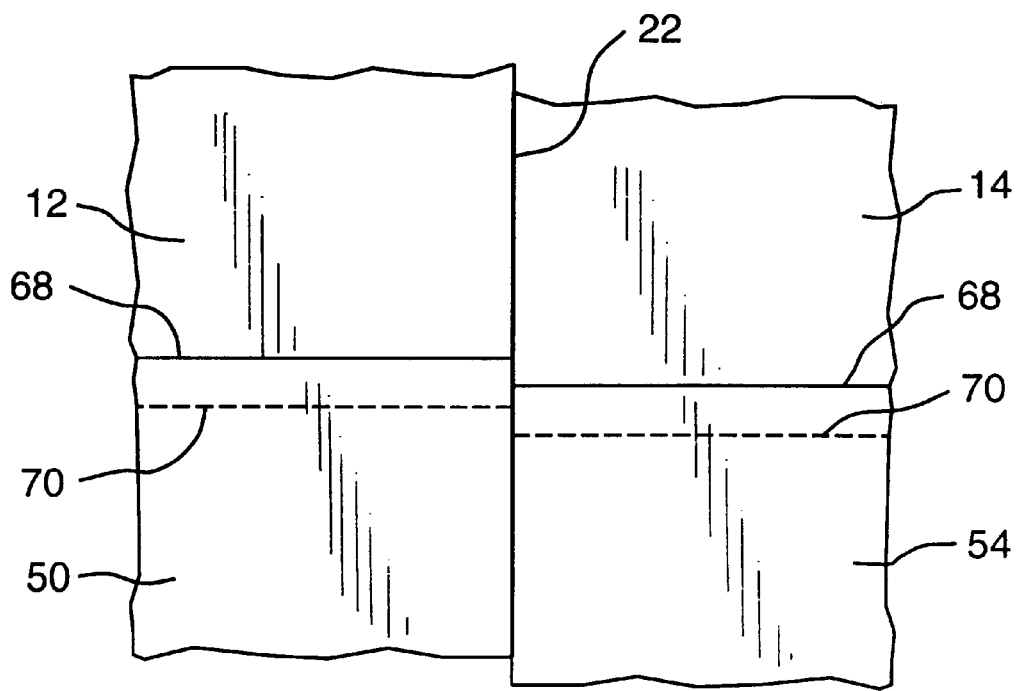
FIG. 5 is a fragmentary view showing an offset score in a collapsible box of this invention.
Figure 6:
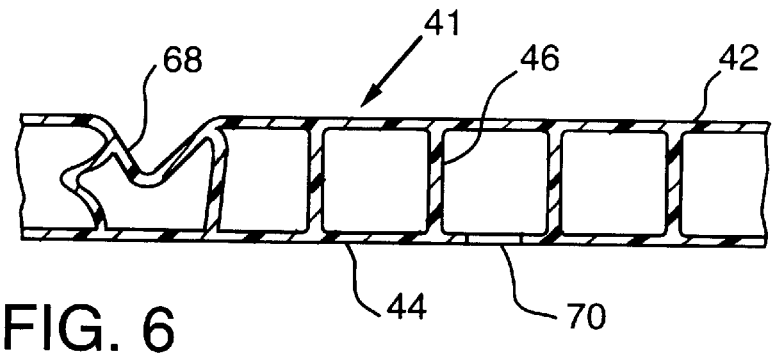
FIG. 6 is a fragmentary cross-section through a hinge score of this invention before the corrugated plastic is folded at the score.

The hinge lines between the side walls 12, 14 and the bottom end flaps 50, 52, 54 of a box may also be vertically offset as is shown in FIG. 5. Such hinge lines preferably are formed by a crushed score line 68 and a perforated score line 70 parallel to the crushed score line. The two score lines 68, 70 may be spaced apart approximately one to two times the thickness of the corrugated plastic sheet material. The crushed score line 68 is formed by well known techniques in which a score tool or indenter is pressed against one face 42 of the corrugated material to collapse or crush the connecting ribs 46 in the material (FIG. 6). The perforated score 72 is a line of perforations cut through one facing sheet of the corrugated plastic. The crushed score 68 is preferably on the inside face (toward inside of box) of the plastic, and the perforations in the perforated score are preferably through the exterior face of the plastic, and the perforated score 70 is preferably the upper score in the hinge line. However, such locations of the scores are not critical to the invention.

Figure 7:
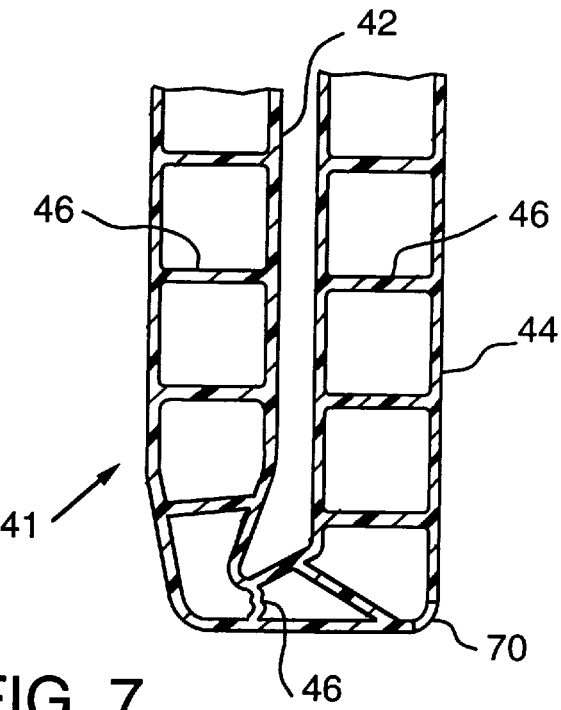
FIG. 7 is a fragmentary cross-section through a hinge score of this invention showing the corrugated plastic folded at the score.

FIG. 6 shows the parallel scores 68, 70 which form a hinge line of this invention, before the plastic 41 is folded or hinged, and FIG. 7 shows the plastic after it has been folded. The weaker perforated score 70 is designed to fold first and provide the desired dimensional control in the manufacture of the box. The crushed score 68 provides another bend point for the flap so each score has to accommodate only 90° of folding. This double hinged score enables the flaps to fold more easily and accurately as compared to a single score.

The vertically offset, horizontal scores 68, 70 or 68a, 70a at the bottom of adjacent walls 12 and 14 as seen in FIGS. 5, 6, and 7 provide more stability to a box of this invention. A box having such an offset score sets up better and has less memory when erected. The reduction in memory enables the box to stay erected without collapsing on itself. The bottom full overlap flap 54 (FIG. 3) also tends to lay more flat in boxes with offset scores, which is beneficial when filling the box with light weight products like potato chips.

Figure 8:
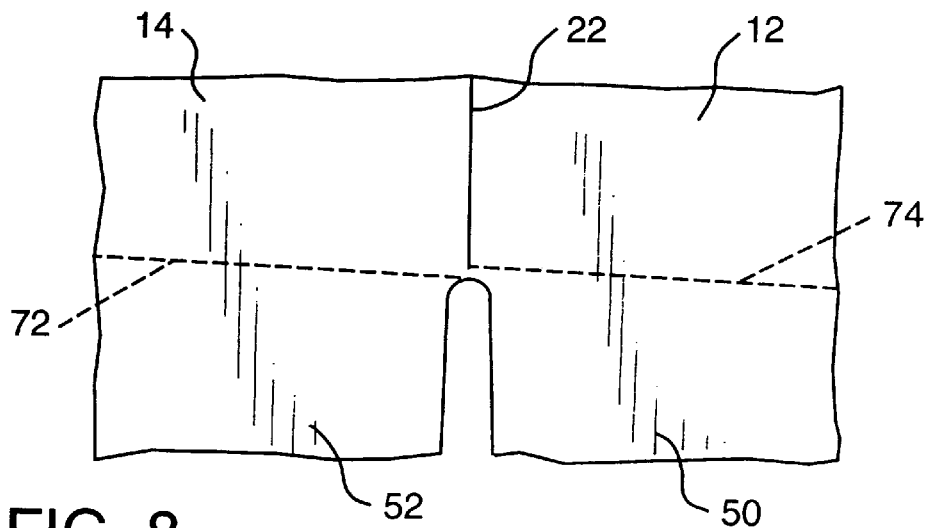
FIG. 8 is a fragmentary view showing a diagonal score in a collapsible box of this invention.

FIG. 8 shows diagonal hinge/score lines that may be used as an alternative to the offset scores of FIG. 5. In the embodiment of FIG. 8, the score lines 72, 74 are parallel to each other, but extend diagonally or at an angle (about 5–10°) to the score line 22 between the walls 12, 14. This alternative is more typically used when the bottom or top closure on the box has panels adapted to be closed and interlocked by a conventional French fold, instead of an automatically locking bottom closure as illustrated in FIGS. 1 and 3. The purpose of the horizontally running diagonal scoring is to alleviate the stress and memory involved when all the scoring is on the same plane when mechanically interlocking the top or bottom flaps, commonly known as French Folding the box. If the scores run on the same plane, the flaps do not lay flat when interlocked; they bow outwardly a great deal. This is partially caused by the material being on the same plane and trying to occupy the same space, when in reality, one flap need to be a little lower (approximately the thickness of the material being folded) than the adjacent interlocking flap. In order for the flaps to lock together, on each flap, half is above the adjacent panel on one side, and tucked underneath the adjacent panel on the opposite side. Therefore, the score needs to not run parallel to the floor, but diagonally to accommodate the flap being higher on one end than the other. The diagonal scoring allows the flaps to lay flatter when engaged and helps minimize the possibility of a load tipping due to the flaps bowing too much using conventional scoring.

Figure 9:
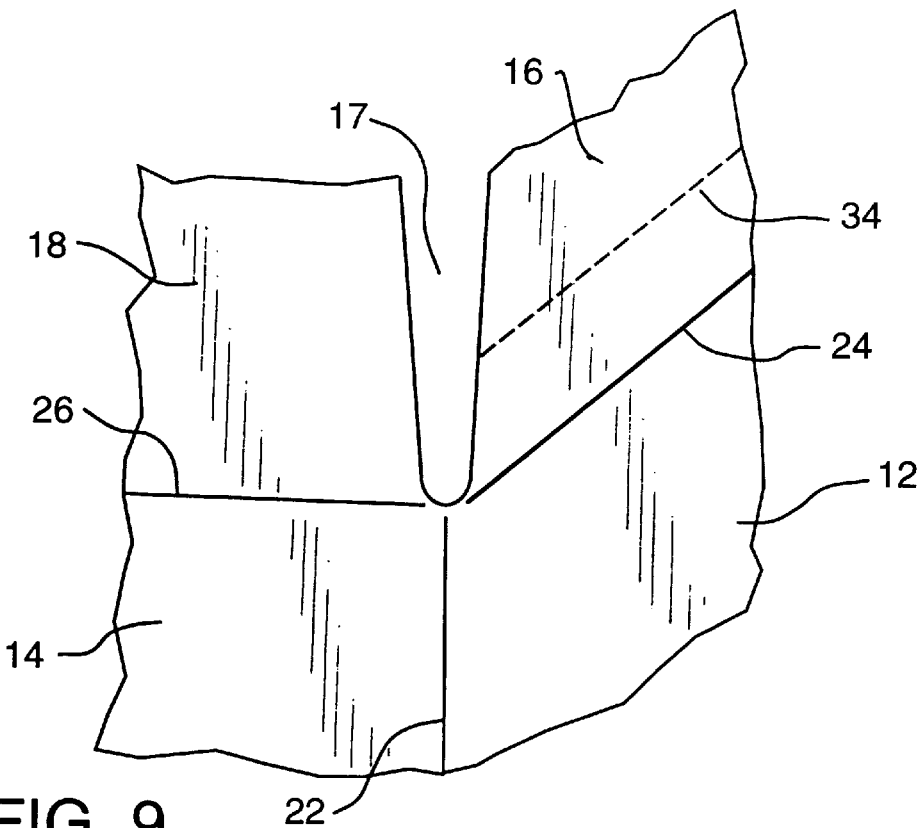
FIG. 9 is a fragmentary view of a top corner of a box of this invention showing the score lines at the corner intersection of the side walls and top flaps.

FIG. 9 shows additional features of the bend/score lines in a box of this invention. As seen in this figure, the score lines 22, 24, 26, 34 between the walls 12, 14 and flaps 16, 18 terminate short of the edges of the flaps and short of the slots cut between panels. For example, hinge/score line 34 in flap 16 and hinge/score lines 24, 26 between walls 12, 14 and panels 16, 18 terminate approximately ½–1½ inches and preferably 1 inch (1") short of the edges of the flaps 16, 18. Terminating the scores short of the flaps helps reduce weak points that could start a tear. Tears tend to propagate in plastic once a tear has started. Accordingly, prior art boxes having scores that extend into the slots between flaps are much more susceptible to tearing than are boxes of this invention.

The vertical hinge/score lines 22 also terminate short of the slot 17 between flaps 16 and 18. A gap of unscored plastic approximately 1 inch long is left at the end of each vertical score. This helps reduce weak points that could be the start of a tear in the plastic.

Figure 10:
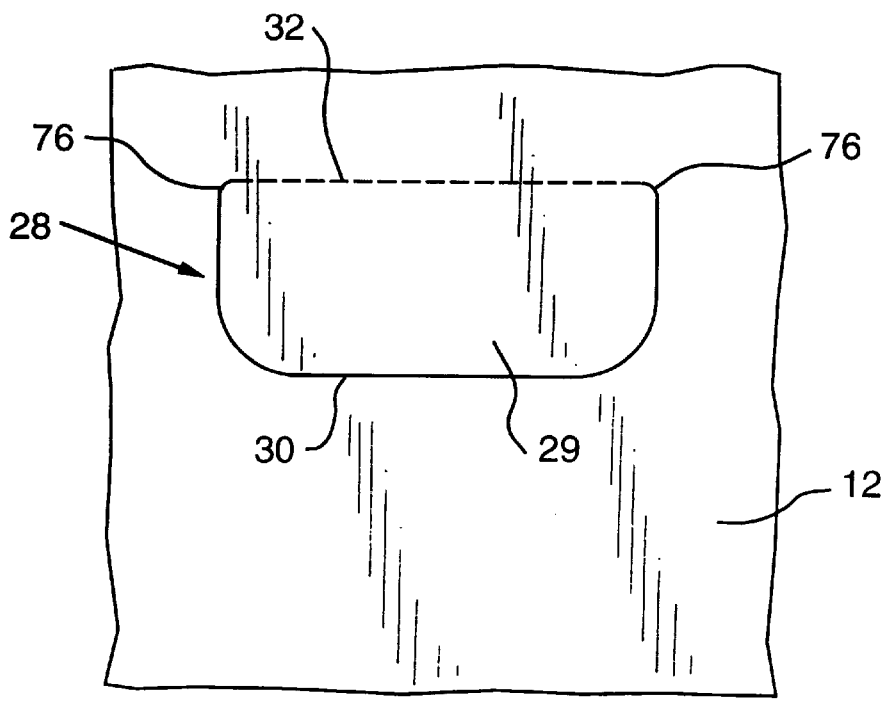
FIG. 10 is a fragmentary side elevation of a vertical width wall of a box of this invention showing a hand hold in the width wall.

FIG. 10 shows a hand hold in a vertical width panel 12. The hand hold is formed by a cut line 30 across the bottom and up both sides of the hand hold to define a flap 29 of plastic in the hand hold. It further includes a score line 32 across the top of the hand hold 28 which facilitates hinging of the flap 29 of plastic. The score line 32 can be either a crushed score or a perforated score and may be in either the inside or outside facing sheet in the plastic. However, the score line 32 is preferably a crushed score on the inside face of the plastic. In accordance with this invention, the cut line 30 ends in a radius or rounded corner 76 at the top of the hand hold 28 on both sides of the hand hold. The rounded corners 76 move the stress point in the plastic away from the top end of the vertical sides of the hand hold 28 and spreads the stress point to reduce risk of tearing the plastic during lifting of a box of this invention. Conventional hand holds, which do not include rounded corners and which end parallel to the flute lines, tend to tear easily. The rounded corners 76 of the preferred embodiment shown in FIG. 10 spread the load across the score line 32.

It is therefore seen that this invention provides an improved collapsible box made of corrugated plastic that can be manufactured and assembled economically by high speed equipment. The box is more convenient to use and also more durable than prior art boxes. It will be apparent to those skilled in the art that numerous modifications can be made to the preferred embodiments selected for illustration without departing from the invention or the scope of the claims appended hereto. For example, hook and loop fasteners, such as those made under the trade designation Velcro® by the Velcro Company, could be used to effect closure of the top and/or bottom of the box.

What is claimed is:

1. A collapsible box made of corrugated plastic comprising at least four vertical side walls separated by parallel, vertical score lines in the corrugated plastic, each of said vertical side walls having a bottom edge, and wherein said corrugated plastic has a plurality of flutes in it and said flutes are disposed in said vertical side walls at an angle to vertical and to said bottom edges so that each of said vertical score lines crosses two to a maximum of four of said flutes at an angle between 0.75° and 4° of said vertical score line.

2. A collapsible box as set forth in claim 1 in which each of said vertical score lines comprises a line along which said corrugated plastic is deformed inwardly on at least one face of the plastic.

3. A collapsible box as set forth in claim 1 in which said flutes are disposed at an angle of about 1 to 2 degrees to vertical.

4. A collapsible box as set forth in claim 1 in which each of said vertical score lines crosses at least three flutes.

5. A collapsible box as set forth in claim 1 in which said corrugated plastic comprises extruded sheet material having parallel facing sheets and integral connecting ribs between the facing sheets.

6. A collapsible box as set forth in claim 1 in which said corrugated plastic comprises parallel facing sheets bonded on opposite sides of a corrugated intermediate sheet.

7. A method for forming a blank for a collapsible box made of corrugated plastic comprising:

providing a sheet of corrugated plastic comprising opposed facing sheets joined together by spaced apart ribs between the facing sheets;

cutting a blank for a collapsible box from said sheet of plastic, said blank including at least four side walls having side edges and bottom edges; and forming parallel score lines in the blank between said side walls with said sheet of plastic being disposed with said ribs at an angle of about 0.75°–4.0° to said score lines that are formed in said blank and to said bottom edies during said cutting of said blank.

8. A method as set forth in claim 7 in which said ribs are disposed at an angle of about 1 to 2 degrees to said score lines which are formed in said sheet of corrugated plastic.

9. A method as set forth in claim 7 in which said corrugated plastic has been extruded and includes said ribs integrally connecting said facing sheets.

10. A method as set forth in claim 7 in which said ribs are in the form of a corrugated intermediate sheet bonded between said facing sheets.

11. A method as set forth in claim 7 in which each of said score lines is formed in said sheet of corrugated plastic across at least two of said ribs.

12. A blank for a collapsible box, said blank comprising a sheet of corrugated plastic having flutes in it and including at least four side walls separated by parallel score lines, wherein said flutes are disposed at an angle to said score lines and to said bottom edges of said side walls so that each of the score lines crosses two to a maximum of four of said flutes at an angle between 0.75° and 4° of said score lines.

13. A blank as set forth in claim 12 in which said flutes are disposed at an angle of about 1 to 3 degrees to said score lines.

14. A blank as set forth in claim 12 in which said corrugated plastic comprises facing sheets and integral connecting ribs between the facing sheets.

15. A blank as set forth in claim 12 in which said sheet of corrugated plastic comprises facing sheets bonded to opposite sides of a corrugated intermediate sheet.

16. A collapsible box made of corrugated plastic including at least four vertical side walls separated by parallel, vertical score lines in said corrugated plastic wherein said corrugated plastic has a plurality of flutes, and said flutes in the corrugated plastic in each vertical side wall are disposed at an angle to at least one of said vertical score lines between side walls and to bottom edges of said side walls so that said vertical score line crosses two to a maximum of four of said flutes at an angle between 0.75° and 4° of said vertical score lines.

17. A collapsible box as set forth in claim 16 which includes a bottom end flap integrally connected to each of said side walls through a hinge line.

18. A collapsible box as set forth in claim 16 in which said flutes are parallel to one another.

* * * * *

UNITED STATES PATENT AND TRADEMARK OFFICE
CERTIFICATE OF CORRECTION

PATENT NO. : 6,102,280
DATED : August 15, 2000
INVENTOR(S) : Fred Dowd

It is certified that error appears in the above-identified patent and that said Letters Patent is hereby corrected as shown below:

<u>Column 7,</u>
Line 10, "edies" should read -- edges --.

Signed and Sealed this

Seventh Day of May, 2002

Attest:

JAMES E. ROGAN
*Attesting Officer*  *Director of the United States Patent and Trademark Office*